United States Patent [19]
Lynch et al.

[11] Patent Number: 5,533,302
[45] Date of Patent: Jul. 9, 1996

[54] MODULAR PLANTING SYSTEM

[76] Inventors: Carroll L. Lynch; Robert E. Graven; Robert L. Graven, all of P.O. Box 6732, Maryville, Tenn. 37802-6732

[21] Appl. No.: 278,247

[22] Filed: Jul. 21, 1994

[51] Int. Cl.$^6$ ............................................. A01G 9/02
[52] U.S. Cl. ........................................... 47/82; 47/66
[58] Field of Search ............................... 47/82, 83, 66 P, 47/66 D

[56] References Cited

U.S. PATENT DOCUMENTS

| | | | |
|---|---|---|---|
| 4,216,617 | 8/1980 | Schmidt | 47/82 |
| 4,389,813 | 6/1983 | Jaques | 47/83 |
| 4,779,378 | 10/1988 | Mason | 47/83 |
| 5,276,997 | 1/1994 | Swearengin | 47/82 |

FOREIGN PATENT DOCUMENTS

| | | | |
|---|---|---|---|
| 1960336 | 6/1971 | Germany | 47/83 |
| 1200430 | 7/1970 | United Kingdom | 47/83 |

OTHER PUBLICATIONS

Mechanics' Magazine, 1st Series vol. 44 published 1846.

*Primary Examiner*—Henry E. Raduazo

[57] ABSTRACT

A modular planting system for growing a plurality of plants arranged in a vertical column. The inventive device includes a plurality of modular planting units which may stacked together at various relative angular orientations to form a vertical column. Each of the modular planting units includes a center column having a pair of plant receptacles projecting from both sides of the center column. A mounting flange extends downwardly from a lowermost portion of the center column and is arranged for reception within an uppermost potion of a center column of another planting unit. In addition, a water system for dispensing water to each of the individual plant receptacles, and supporting structure for supporting the system in a vertical orientation is also provided.

1 Claim, 5 Drawing Sheets

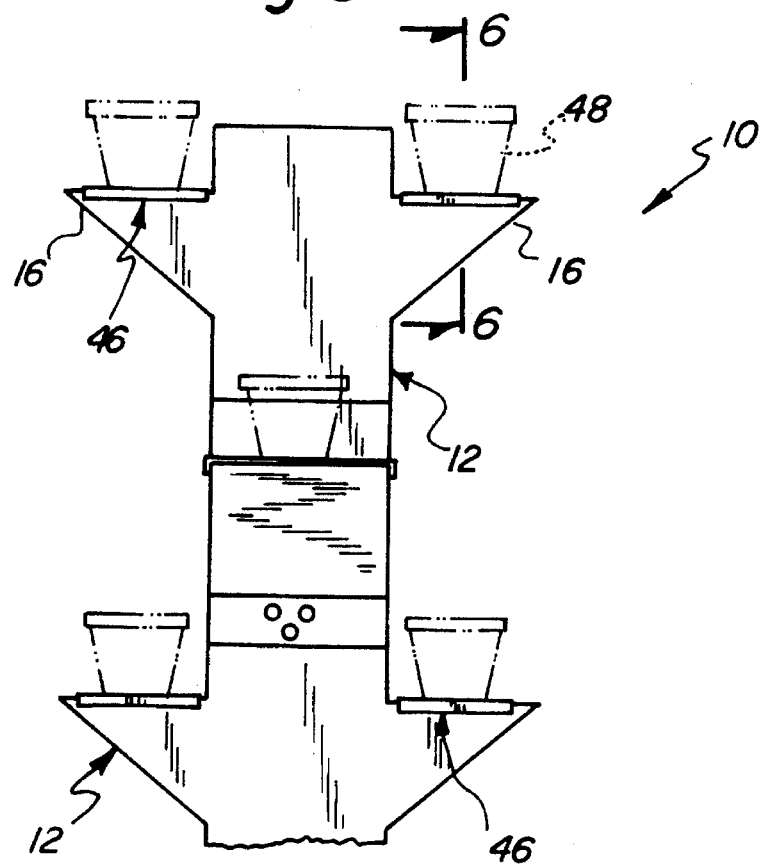
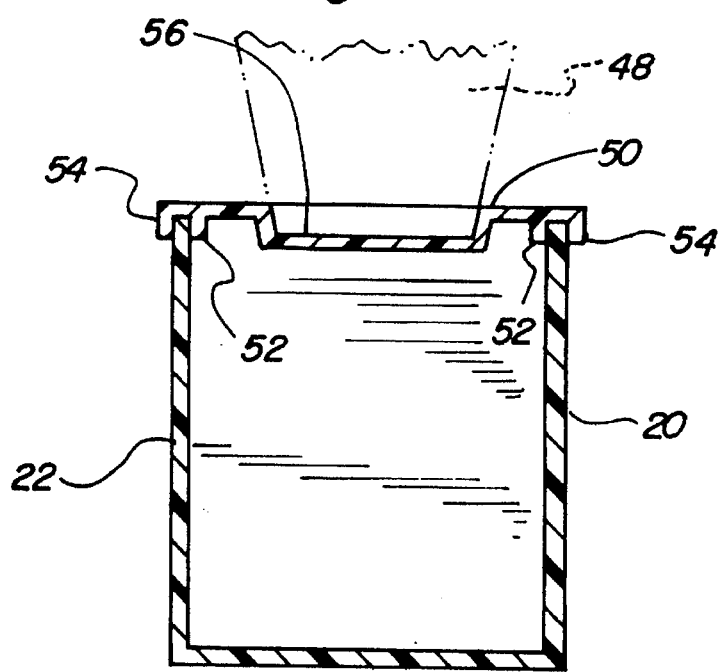

MODULAR PLANTING SYSTEM

BACKGROUND OF THE INVENTION

1. Field of the Invention

The present invention relates to planters and more particularly pertains to a modular planting system for growing a plurality of plants arranged in a vertical column.

2. Description of the Prior Art

The use of planters is known in the prior art. More specifically, planters heretofore devised and utilized for the purpose of supporting living plant organisms are known to consist basically of familiar, expected and obvious structural configurations, notwithstanding the myriad of designs encompassed by the crowded prior art which have been developed for the fulfillment of countless objectives and requirements.

For example, a planting wall is illustrated in U.S. Pat. No. 3,389,499 which includes a plurality of vertically spaced blocks adapted to contain soil and plants. The blocks are laterally staggered, locked together and form a wall that may be planted on both sides to provide a sturdy and attractive structure.

Another patent of interest is U.S. Pat. No. 5,136,807 which discloses an arrangement for growing plants including a multiplicity of planters each having a bottom face, sidewalls, and an open upper face, with the containers being at least partially filled with a medium for growing plants and being stacked in the form of a self supporting column.

Other known prior art planters include U.S. Pat. No. 5,031,359; and U.S. Pat. No. 4,123,873.

While these devices fulfill their respective, particular objectives and requirements, the aforementioned patents do not disclose a planting system for growing a plurality of plants arranged in a vertical column which includes a plurality of modular planting units which may be stacked together at various relative angular orientations to form the vertical column, wherein each of the modular planting units includes a center column having a pair of plant receptacles projecting from opposed sides of the center column, and a mounting flange extending downwardly from a lowermost portion of the center column and arranged for reception within an uppermost portion of a center column of another planting unit. Furthermore, none of the known prior art planters teach or suggest a modular planting system of the aforementioned structure which further includes a watering system for dispensing water to each of the individual plant receptacles, and supporting structure for supporting the system in a vertical orientation.

In these respects, the modular planting system according to the present invention substantially departs from the conventional concepts and designs of the prior art, and in so doing provides an apparatus primarily developed for the purpose of growing a plurality of plants arranged in a vertical column.

SUMMARY OF THE INVENTION

In view of the foregoing disadvantages inherent in the known types of planters now present in the prior art, the present invention provides a new modular planting system construction wherein the same can be utilized for supporting a plurality of plants arranged in a vertical column. As such, the general purpose of the present invention, which will be described subsequently in greater detail, is to provide a new modular planting system apparatus and method which has many of the advantages of the planters mentioned heretofore and many novel features that result in a modular planting system which is not anticipated, rendered obvious, suggested, or even implied by any of the prior art planters, either alone or in any combination thereof.

To attain this, the present invention generally comprises a modular planting system for growing a plurality of plants arranged in a vertical column. The inventive device includes a plurality of modular planting units which may stacked together at various relative angular orientations to form a vertical column. Each of the modular planting units includes a center column having a pair of plant receptacles projecting from both sides of the center column. A mounting flange extends downwardly from a lowermost portion of the center column and is arranged for reception within an uppermost potion of a center column of another planting unit. In addition, a water system for dispensing water to each of the individual plant receptacles, and supporting structure for supporting the system in a vertical orientation is also provided.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new modular planting system apparatus and method which has many of the advantages of the planters mentioned heretofore and many novel features that result in a modular planting system which is not anticipated, rendered obvious, suggested, or even implied by any of the prior art planters, either alone or in any combination thereof.

It is another object of the present invention to provide a new modular planting system which may be easily and efficiently manufactured and marketed.

It is a further object of the present invention to provide a new modular planting system which is of a durable and reliable construction.

An even further object of the present invention is to provide a new modular planting system which is susceptible of a low cost of manufacture with regard to both materials and labor, and which accordingly is then susceptible of low prices of sale to the consuming public, thereby making such modular planting systems economically available to the buying public.

Still yet another object of the present invention is to provide a new modular planting system which provides in the apparatuses and methods of the prior art some of the advantages thereof, while simultaneously overcoming some of the disadvantages normally associated therewith.

Still another object of the present invention is to provide a new modular planting system for supporting and growing a plurality of plants arranged in a vertical column.

Yet another object of the present invention is to provide a new modular planting system which includes a plurality of modular planting units which may be stacked together at various relative angular orientations to form the vertical column, wherein each of the modular planting units includes a center column having a pair of plant receptacles projecting from opposed sides of the center column, and a mounting flange extending downwardly from a lowermost portion of the center column and arranged for reception within an uppermost portion of a center column of another planting unit.

Even still another object of the present invention is to provide a new modular planting system which further includes a watering system for dispensing water to each of the individual plant receptacles, and supporting structure for supporting the system in a vertical orientation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a front elevation view of a modular planting system including a plurality of Plates.

FIG. 6 is an enlarged cross-sectional view taken along the line 6—6 of FIG. 5.

DESCRIPTION OF THE PREFERRED EMBODIMENT

Figure 1:
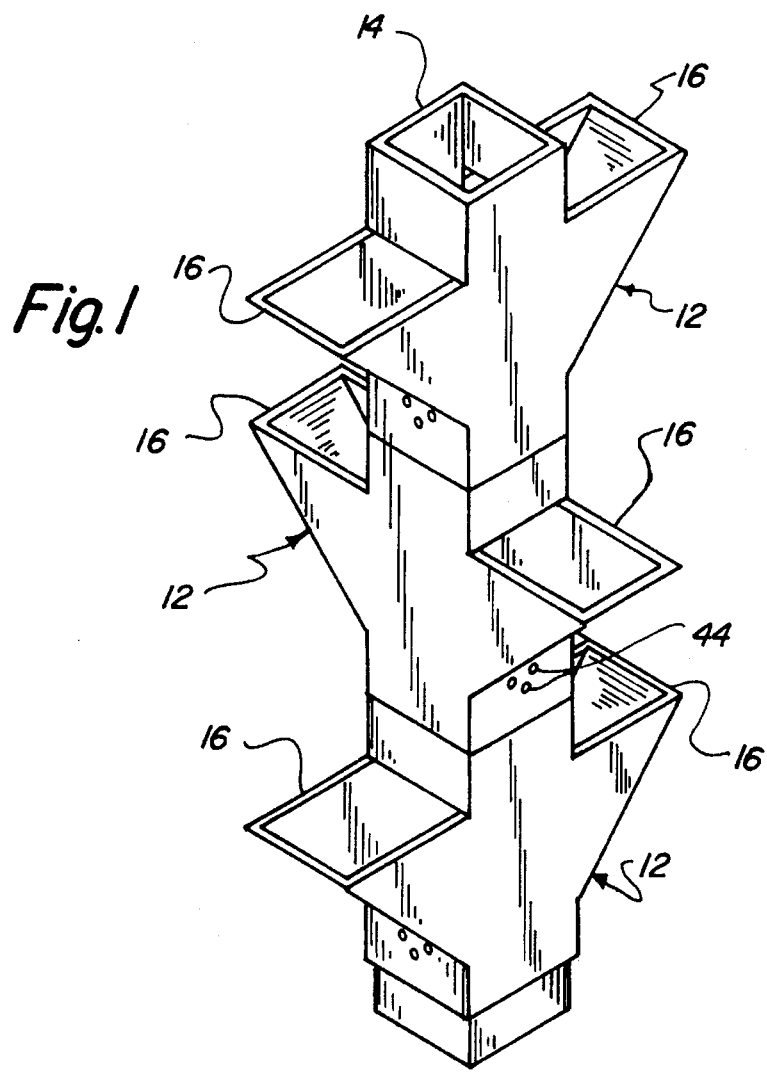
FIG. 1 is an isometric illustration of a modular planting system comprising the present invention.
Figure 2:
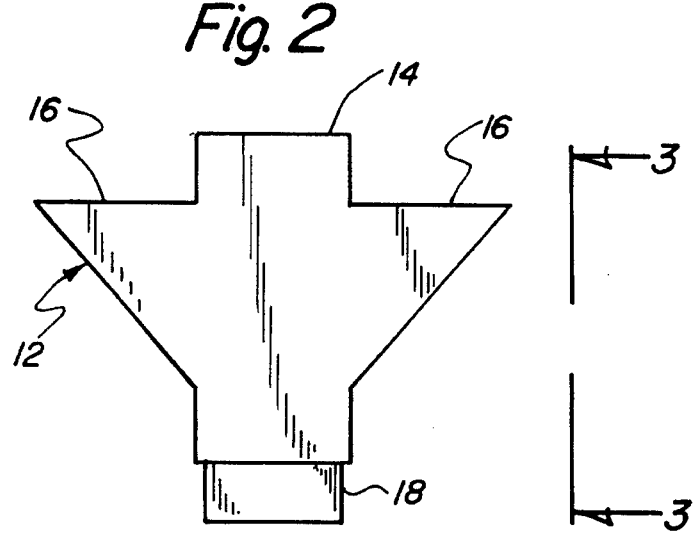
FIG. 2 is a front elevation view of a planting unit comprising a portion of the present invention.

With reference now to the drawings, and in particular to FIGS. 1–10 thereof, a new modular planting system embodying the principles and concepts of the present invention and generally designated by the reference numeral 10 will be described.

More specifically, it will be noted that the modular planting system 10 comprises a plurality of planting units 12 which can be stacked one on top of another at various relative angular orientations, as best illustrated in FIG. 19 . Each of the planting units 12 is substantially similar in construction and design and includes a center column 14 having a pair of lateral receptacles 16 extending from opposed sides of the center column, with a mounting flange 18 extending downwardly from the center column and arranged for reception within another center column of another planting unit, thereby coupling the planting units together in the vertical orientation illustrated in FIG. 1. The center column 14 is preferably hollow with the lateral receptacles being in communication through the hollow center column. Thus, a continuous volume of plant growing medium, such as soil or the like, may extend from a first one of the lateral receptacle 16 through the center column 14 to a second one of the lateral receptacles.

Figure 3:
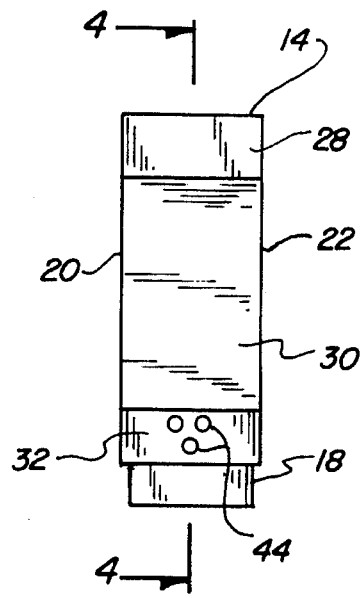
FIG. 3 is a side elevation view of the planting unit.
Figure 4:
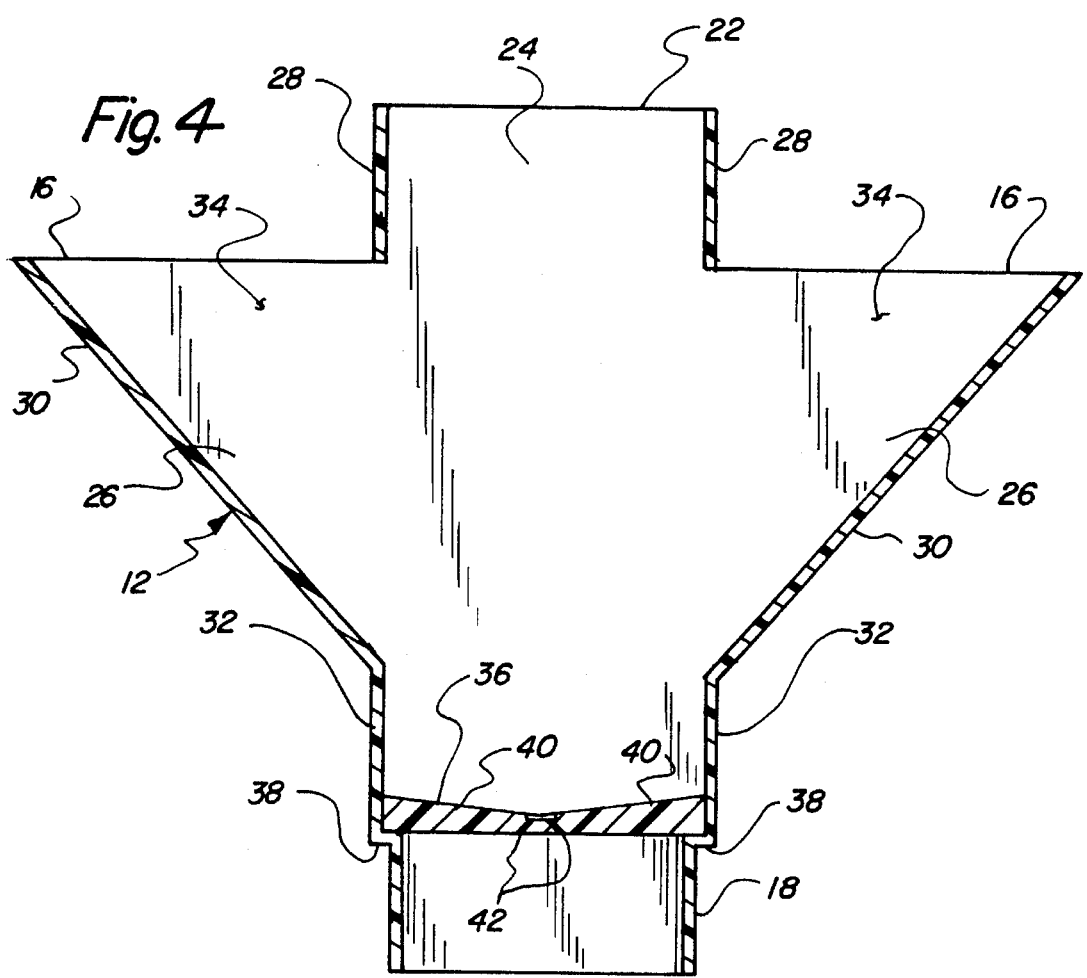
FIG. 4 is a cross-sectional view taken along the line 4—4 of FIG. 3.

Referring now to FIGS. 3 and 4 can be shown that each of the planting units 12 comprises a front wall 20 spaced from a rear wall 22. The front and rear walls 20, 22 are substantially identical in shape and each includes a rectangular portion 24 having a pair of oppositely extending triangular wings 26 which are integrally or otherwise fixedly secured to the rectangular portion 24, as best illustrated in FIG. 4. The front wall 20 is fixedly secured to the rear wall 22 and supported in the spaced, parallel orientation indicated in FIG. 3 by a plurality of side walls which include a pair of spaced upper side walls 28 which orthogonally extend between the rectangular portions 24 of the front and rear walls, a pair of medial side walls 30 which orthogonally extend between the spaced triangular wings 26 of the front and rear walls, and a pair of lower side walls 32 which orthogonally extend between the rectangular portions 24 of the front rear walls. By this structure, the medial side walls 30 and the lower side walls 32 cooperate with the front and rear walls 20, 22 to define planting spaces 34 within the lateral receptacle 16 which are operable to support and permit the growth of a plant extending from the lateral receptacles.

To support the aforementioned growing material within the hollow center column 14 as well as the planting spaces 34 of the lateral receptacle 16, a soil retainer 36 is removably supported across a lowermost portion of the center column between the lower side walls 32 and the front and rear walls 20, 22 by a ridge 38 which extends orthogonally and radially inward from the lower sidewalls and the front and rear walls to integrally or otherwise fixedly join with the mounting flange 18, as best illustrated in FIG. 4. The soil retainer 36 preferably is shaped so as to define angled floor portions 40 which cooperate to guide water and other fluid though a plurality of drain holes 42 which extend through the soil retainer 36. Preferably, the drain holes 42 extend through the soil retainer 36 at an angle of approximately forty five degrees relative to a vertical axis projecting orthogonally through the soil retainer. The soil retainer 36 is operable to prevent soil compaction of soil within the lower planting units by the weight of the soil contained within upper planting units 12. Further the angular orientation of the drain holes 42 serves to disperse water and other fluids travelling from one planting unit 12 through the soil retainer 36 to another planting unit therebelow. In addition, a plurality of vent apertures 44 extend through the lower sidewalls 32 to provide for increased aeration and ventilation of the growing medium or soil contained within each of the planting units 12.

Variations in the configuration of each of the planting units 12 include forming the center column 14 in a substantially tubular or circular shape, forming the lateral receptacles 16 in a substantially quarter round or semi circular shape, as well as providing each of the center columns with a plurality of lateral receptacles 16, such as 3 or 4, therearound. Preferably, the planting units 12 are formed of an integrally molded PVC plastic of a white color. However, it is within the intent and purview of the present invention to integrally mold or otherwise secure together the components 20–38 of each of the planting units 12 by any conventional means utilizing any conventionally known material.

Referring now to FIGS. 5 and 6, it can be shown that the present invention 10 may also include a plurality of shelf caps 46 with each of the shelf caps being selectively mountable across the opening of each lateral receptacle 16 so as to support a flower pot 48 or the like thereon. To this end and as best illustrated FIG. 6, each of the shelf caps 46 comprises a cap plate 50 having a pair of inner flanges 52 spaced from a respective pair of outer flanges 54, with the inner flanges cooperating with respective outer flanges to support the cap plate 50 atop both the front and rear walls 20, 22. The cap plate 50 includes a recessed area 56 for receiving the flower pot 48 and imparting lateral stability to such pot. In this manner, the modular planting system 10 may be utilized to support flower pots 48 or other containers as illustrated in FIG. 5.

Figure 7:
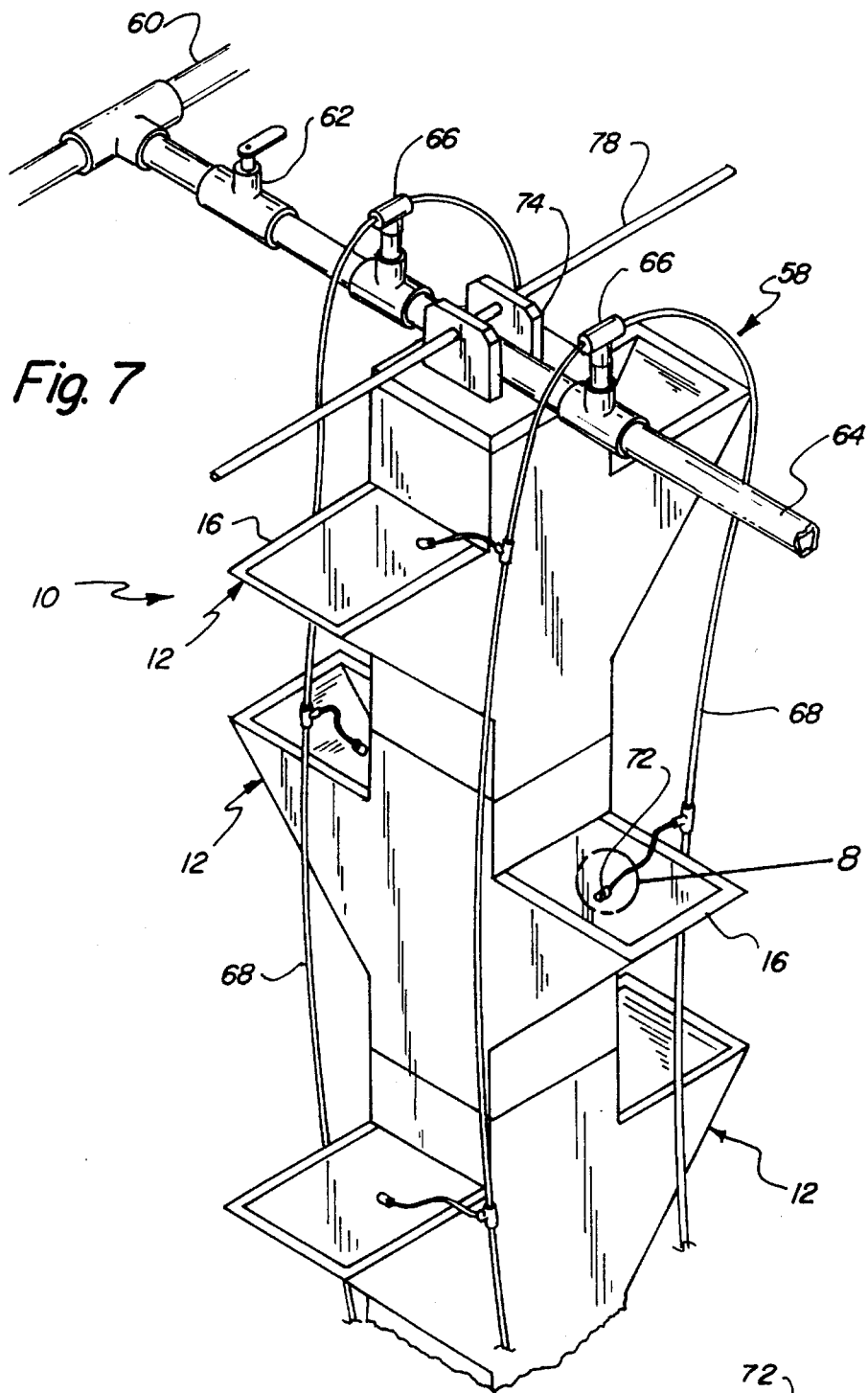
FIG. 7 is an isometric illustration of the modular planting system including a watering system.
Figure 8:
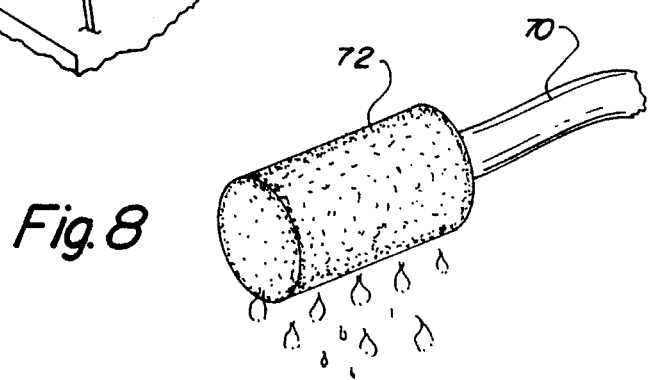
FIG. 8 is a an enlarged isometric illustration of a portion of the invention as set forth in FIG. 7.

FIG. 7 and 8 illustrate the module planting system 10 as further including a water system means 58 for dispensing a fluid to each of the plant receptacles 16. To this end, the water system means 58 comprises a main supply line 60 supplying water or other fluids through a valve 62 to a row supply line 64 from which a pair distribution fittings 66 project. The distribution fittings 66 are in fluid communication with the row supply line 64 and are operable to permit fluid communication between the row supply line and a plurality of delivery hoses 68 which drape downwardly therefrom, as best illustrated in FIG. 7. Each of the delivery hoses 68 supports and fluidly communicates with a plurality of delivery hose branches 70 which extend into the individual plant receptacle 16. The delivery hose branches 70 each terminate at a diffuser 72 which operates to diffuse and aerate the water or other fluid being dispensed into the plant receptacle 16. Preferably, the diffuser 72 comprises a porous ceramic material providing a tortuous path thorough which the fluid must pass. By this structure the watering system means 58 operates to selectively maintain a desired amount of water or other growing fluid within each of the plant receptacles 16. It should be noted that the delivery hoses 68 and associated branches 70 may be positioned within the columns 14 so as to provide for increased aesthetic appearance of the device 10.

In certain growing situations it is desirable to form a plurality of both rows and columns of the modular planting systems 10. In such a case, it is preferable that the row supply lines 64 extend across adjacent columns and rest upon the uppermost planting unit 12, as best illustrated in FIG. 7. To this end, a stabilizing cap 74 may be positioned atop the center column 14 of the uppermost planting unit 12. The stabilizing cap 74 includes a pair of spaced plates 76 between which the row supply line 64 preferably extends. To stabilize adjacent rows of a single column, a stabilizing rod 78 extends through and may be secured to the spaced plates 76 by unillustrated clips, pins or other fastening means. By this structure, a network of modular planting units 10 which are structurally and fluidly interconnected may be arranged within a greenhouse, a planting field, or other gardening or cultivating area.

Figure 9:
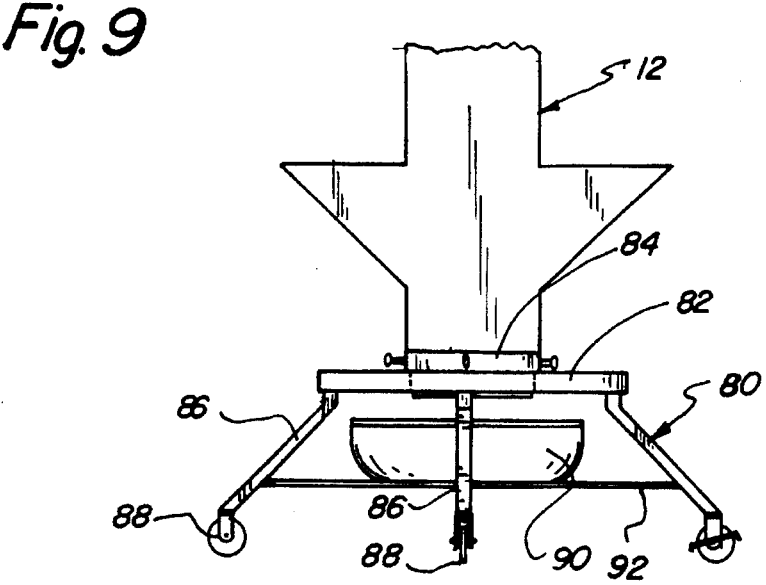
FIG. 9 is a front elevation view of the modular planting system including a wheeled carriage.
Figure 10:
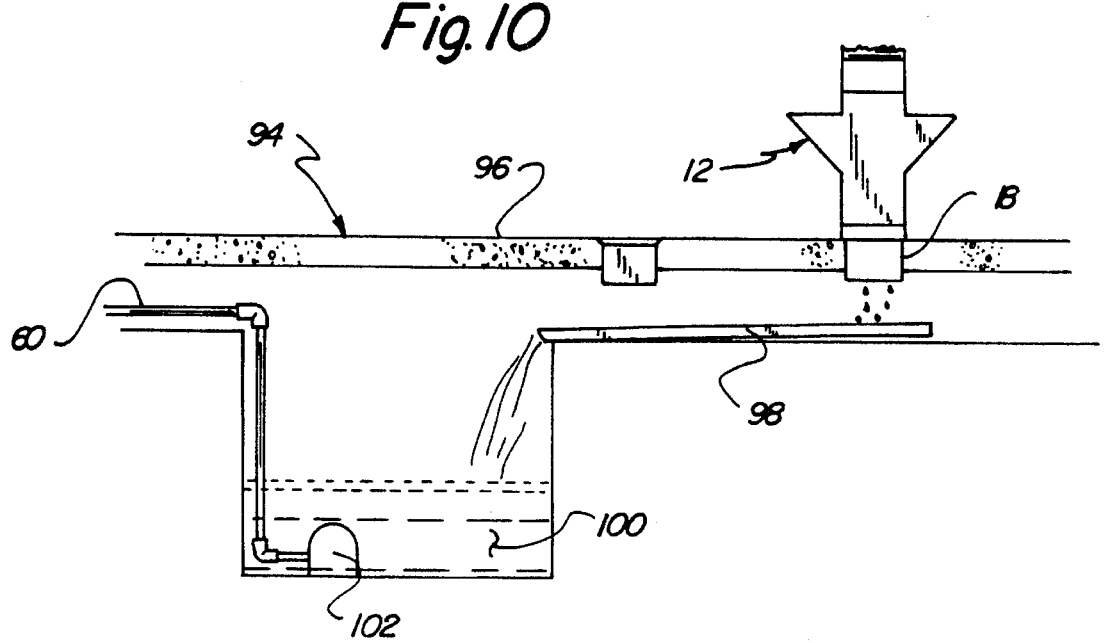
FIG. 10 is a front elevation view of the modular planting system including a floor installation.

FIGS. 9 and 10 illustrate supporting structure means which may be utilized to support each of the modular planting systems 10 in a substantially vertical orientation. To this end, a first supporting structure means comprises a wheeled carriage 80 having a frame 82 including a mounting receiver 84 which engages and supports the mounting flange 18 of a lowermost planting unit 12, as shown in FIG. 9. A plurality of support legs 86 extend from the frame 82 and terminate in rotatably mounted castors 88, thereby permitting selective wheeled movement of the first supporting structure means or wheeled carriage 80 across a ground surface. Further, a drain bowl 90 is supported beneath the center column 14 of the lowermost planting unit 12 by a transverse member 92 which extends between at least a pair of the support legs 86.

A second supporting structure means for supporting a modular planting system 10 in a vertical orientation is illustrated in FIG. 10 and comprises a floor installation 94 wherein a preferably concrete floor 96 includes an unlabeled rectangular aperture through which the mounting flange 18 of the lowermost planting unit 12 projects and engages. Beneath the floor 96 is a gutter 98 which collects and directs water or other fluids emanating from the drain holes 42 of the soil retainer 36 to a sump 100 formed in a subsurface area beneath the floor 96. A pump 102 is positioned within the sump 100 and fluidly connected to the main supply line 60 so as to recirculate such water or fluid through the watering system means 58. Although not specifically illustrated, it is contemplated that a suitable filtering system may be employed to cleanse and condition such water or fluid.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new modular planting system comprising:

at least one planting unit including a rectangular center column, a top end and a bottom end with at least one pair of rectangular lateral receptacles extending from opposed sides of said center column, a mounting flange extending downwardly from said center column, said mounting flange being receivable within another column of another planting unit so as to couple said planting unit to said another planting unit, said center column being substantially hollow with said lateral receptacles being in communication through said hollow center column, whereby a continuous volume of plant growing medium can extend from a first one of the lateral receptacles through said center column to a second one of the lateral receptacles, a soil retainer for each unit removably supported across a lowermost portion of said center column to accommodate the pair of lateral receptacles, said soil retainer including a drain hole extending therethrough, said soil retainer being shaped so as to define angled floor portions which cooperate to guide water and other fluid through said drain hole extending through said soil retainer, said planting unit including a front wall spaced from a rear wall, the front and rear walls being identical in shape and each including a rectangular portion having a pair of oppositely extending triangular wings fixedly secured to said rectangular portion, a pair of spaced upper side walls orthogonally extending between said rectangular portions of said front and rear walls, a pair of medial side walls orthogonally extending between said walls orthogonally extending between said rectangular portions of said front and rear walls; and, a supporting structure means for supporting said modular planting system in a substantially vertical orientation.

* * * * *